United States Patent [19]

Galeski et al.

[11] 4,411,704

[45] Oct. 25, 1983

[54] PROCESS FOR IMPROVEMENT OF ADHESION BETWEEN MINERAL FILLERS AND THERMOPLASTIC POLYMERS

[75] Inventors: Andrzej Galeski; Ryszard Kalinski; Marian Kryszewski, all of Lodz, Poland

[73] Assignee: Polska Akademia Nauk, Lodz, Poland

[21] Appl. No.: 312,042

[22] Filed: Oct. 16, 1981

Related U.S. Application Data

[63] Continuation-in-part of Ser. No. 126,265, Mar. 3, 1980, abandoned.

[51] Int. Cl.³ ............................................. C04B 31/40
[52] U.S. Cl. .................................. 106/308 Q; 427/221
[58] Field of Search ....................... 523/202, 200, 205; 427/220, 221; 106/308 Q

[56] References Cited

U.S. PATENT DOCUMENTS

3,227,657 1/1966 Haden ............................ 106/308 Q
4,186,123 1/1980 Kietzman ........................... 427/220

*Primary Examiner*—Sam Silverberg
*Attorney, Agent, or Firm*—Ladas & Parry

[57] ABSTRACT

The method according to the invention is based upon that the mineral filler, before being mixed with thermoplastic polymer, is coated with a thin layer of liquid ethylene oxide oligomer, optionally in presence of a solvent and then the solvent is evaporated at temperature 50° to 200° C.

By the method according to the invention, a product with much better useful properties is obtained. The product is useful in the plastics industry.

2 Claims, No Drawings

PROCESS FOR IMPROVEMENT OF ADHESION BETWEEN MINERAL FILLERS AND THERMOPLASTIC POLYMERS

CROSS-REFERENCE TO CO-PENDING APPLICATIONS

This application is a continuation-in-part of the co-pending application Ser. No. 126,265 filed Mar. 3, 1980 now abandoned, based on Polish Application P-213,582, filed Feb. 21, 1979.

The subject of the invention is a method for improvement of adhesion between granular mineral fillers and thermoplastic polymers.

BACKGROUND OF THE INVENTION

There is known the introduction of fillers to thermoplastic polymers in order to improve the useful properties but with improved useful properties, the processing properties deteriorate and vice versa.

In the case of polyolefins the improvement of mechanical properties is achieved with great difficulty because of very low physical adhesion and lack of chemical adhesion between the polyolefin and the mineral filler. There are also known methods for improvement of adhesion, relying upon the change of physicochemical properties of the grains of the filler. The simple method of preparation is to give "acidity" to the filler surface by coating the grains with aluminum or magnesium silicate compounds. See, J. Hodgkin, D. Solomon, J. Macromol. Sci. A8 (3) 635 (1974); D. Solomon - BP 1228538 (1969).

Also, from U.S. Pat. No. 4,186,123 (Kietzman) is known a process for coating fibrous minerals, such as asbestos, used as fillers for polymers.

There is also known a method for surface preparation of the fillers by organotitanates. See, Plast.Tech. 22 (4) 71 (1976), Plast.Tech. 22 (4) 81 (1976). For the fillers provided for the polyolefins, coatings made of triisopropylenoxytitanate are applied in a quantity of 0.5 to 3% w/w of the filler.

Among the most popular organic coating substances may be ranked stearic acid, barium, calcium, sodium stearates and their compositions. See, Plast. Tech. 22 (4) 71 (1976), Plast.Tech. 22 (4) 81 (1976), Rev. Plast. Mod. 223, 8 (1975). The known coating media for mineral fillers are silanes, described in the publication Jap. Plastic Age, Sep.-Oct. 33 (1975), Dow Corning Corp. (8-5-70), US-061505, Union Corp. (5-17-68) US-862027.

Silanes of the general chemical formula $R'Si(OR)_3$ possess two types of functional groups, $R'$ and OR. $R'$ is usually a reactive organic group-amine, vinyl, epoxide, methacrylate, bonded to a silicon atom by short aliphatic chains but OR is a hydrolysable ether group.

Through the OR groups, silanes are bound to the surface of the filler, whereas the functional $R'$ groups react with the polymeric matrix. The known method for preparation of the filler surface is coating with a layer of polymer through polymerization of reactive monomer according to either a radical or a cation mechanism. Monomers such as styrene, pyridine, divinylobenzene, acrylic acid etc. are used. See, Jap. Plastic Age, Sep.-Oct. 33 (1975), J. Macromol. Sci A8 (3) 649 (1974), Asaki Chem. Ind. Co. Ltd. 29 (1967) JA 069210 US Polywood Champion Papers Inc. (8-21-70) US 066107.

Polymer coatings of the molecular weight of 500-800 make up to 3% of the filler weight and their thickness ranges from 20 to 30 Å.

The polymer coating may be applied on the surface of the filler in the separate process of preparation or in the presence of the polyolefin during mixing. In this last case, the amount of the catalyzer is used so as to initiate polymerization but not to cause cross-linking of the polyolefin.

SUMMARY OF THE INVENTION

According to the present invention, the method for improvement of adhesion relies upon that a granular mineral filler is coated by a thin layer of liquid ethylene oxide oligomer of molecular weight $M_w = 100-800$, optionally in the presence of a solvent.

The thus prepared mass is dried at a temperature of 50° to 200° C. During the processing, even at a temperature of 250° C., ethylene oxide oligomer is not subject to decomposition and still remains liquid.

Ethylene oxide oligomer is characterized by very good wettability of a range of mineral fillers that are granular such as talc, silica, chalk, kaolin, and quartz. Liquid state of the coating is especially preferable because of the possibility of reproducing the adhesive bonds after their breaking as a result of the application of extensive force. Also fatigue tests revealed considerable improvement of the properties of low-density polyethylene filled with the filler prepared by the method according to the invention. Applied optimal contents of the coating is from 1 to 10% w/w of the filler share in the mixture, depending on its particle size distribution. Simultaneously there exists the possibility of adjusting the mechanical properties of the material by changing the quantity of liquid ethylene oxide oligomer addition. The coating made of ethylene oxide oligomer is especially useful with regard to its low costs, availability and the uncomplicated procedure of coating the grains of the filler.

The invention is more particularly described in the examples given below:

EXAMPLE I 2 g of ethylene oxide oligomer of an average molecular weight equal to 200 is dissolved in 30 g of water and 100 g of kaolin is added with stirring till a thick mass is obtained. Then, the mass is dried in a dryer at a temperature of 80° C. The thus prepared kaolin is mixed with polyethylene of a density of 0.92 g/ccm with a ratio of 6:4 and is granulated. A product of considerably improved mechanical properties is obtained, compared to the case of using non-prepared kaolin for filling.

The results are shown below:

|  | Product obtained according to Example 1 | Product obtained according to Example 1 without the oligomer addition |
| --- | --- | --- |
| modulus of elasticity ($N/m^2 \times 10^6$) | 107 | 115 |
| tensile strength ($N/m^2 \times 10^6$) | 7.7 | 8.4 |
| elongation at fracture (%) | 75 | 30 |
| impact strength ($J/m^2 \times 10^2$) | 106 | 63.8 |

EXAMPLE II

The product is prepared as in Example I, substituting chalk for kaolin and using 10 g of ethylene oxide oligomer. The thus prepared chalk is mixed in a ratio of 5:5 with polyethylene of a density of 0.92 g/ccm. The material obtained possesses much better mechanical properties than in the case of using the non-prepared chalk.

|  | Product obtained according to Example II | Product obtained according to Example II without the oligomer addition |
|---|---|---|
| modulus of elasticity ($N/m^2 \times 10^6$) | 74.2 | 156 |
| tensile strength ($N/m^2 \times 10^6$) | 6.5 | 7.6 |
| elongation at fracture (%) | 215 | 20 |
| impact strength ($J/m^2 \times 10^2$) | 222.8 | 57.9 |

EXAMPLE III

The product is prepared as in Example I, substituting quartz for kaolin and using 1 g of ethylene oxide oligomer. The material obtained possessed much better mechanical properties than in the case of using non-prepared quartz flour.

|  | Product obtained according to Example III | Product obtained according to Example III without the oligomer addition |
|---|---|---|
| modulus of elasticity ($N/m^2 \times 10^6$) | 90.2 | 135.4 |
| tensile strength ($N/m^2 \times 10^6$) | 7.1 | 7.4 |
| elongation at fracture (%) | 90 | 50 |
| impact strength ($J/m^2 \times 10^2$) | 139.3 | 92.2 |

The mixtures with non-modified fillers show large modulus of elasticity and low elongation at fracture values. The materials are brittle and non-ductile.

The introduction of modifying agents like in Examples I, II and III causes the decrease of the modulus of elasticity, practically unchanged tensile strength and considerably increased elongation at fracture values. High values of marked impact strength (measure of brittleness) and high elongation at fracture are the result of the considerable increase in adhesion between the filler and the polyolefin as the result of the introduction of the modifying agent. The considerable increase of elongation at fracture causes the materials obtained from the modified fillers to be ductile and elastic.

EXAMPLE IV

The product is prepared as in Example I, substituting isotactic polypropylene of a density of 0.885 g/ccm for polyethylene and chalk for kaolin, and using 10 g of ethylene oxide oligomer. The material obtained has much better mechanical properties than in the methods using non-prepared chalk and non-filled polypropylene. This is seen from the data given below:

| weight ratio 5:5 | 1 | 2 | 3 | 4 |
|---|---|---|---|---|
| PP+ chalk | 940 | 16.8 | 90 | 48.5 |
| PP+ chalk + +10% oligomer | 570 | 15.8 | 420 | 79.7 |
| PP | 480 | 22.5 | 850 | 55.0 | where
1 is the modulus of elasticity
2—stress at yield point in $N/m^2 \times 10^6$
3—elongation at fracture in %
4—impact strength in $J/m^2 10^2$

EXAMPLE V

The product is prepared as in Example IV by mixing chalk prepared by the method according to the invention in a weight ratio of 6:4 with isotactic polypropylene of a density of 0.885 g/ccm. The material obtained has considerably better mechanical properties than in the case of non-prepared chalk and non-filled polypropylene. This is seen from the data given below:

| weight ratio 6:4 | 1 | 2 | 3 | 4 |
|---|---|---|---|---|
| PP+ chalk | 1200 | 16.9 | 30 | 31.4 |
| PP+ chalk + +10% oligomer | 550 | 11.8 | 328 | 63.0 |
| PP | 480 | 22.5 | 850 | 55.0 | where 1, 2, 3 and 4 are the same as in the table in Example IV.

What is claimed is:
1. A process for improving adhesion between mineral fillers and thermoplastic polymers comprising coating the mineral filler with a thin layer of liquid ethylene oxide oligomer, wherein the mineral filler is a granular mineral filler selected from the group consisting of talc, silica, chalk, quartz, and kaolin, and the ethylene oxide oligomer has a molecular weight of 100–800.
2. The process of claim 1 wherein the process is carried out in the presence of solvent and then the resultant mass is dried at a temperature of 50° to 200° C. to evaporate the solvent.

* * * * *